Nov. 21, 1961  L. T. KNOCKE  3,009,176
METHOD OF ASSEMBLY OF BOLT AND WASHER
Filed July 18, 1957
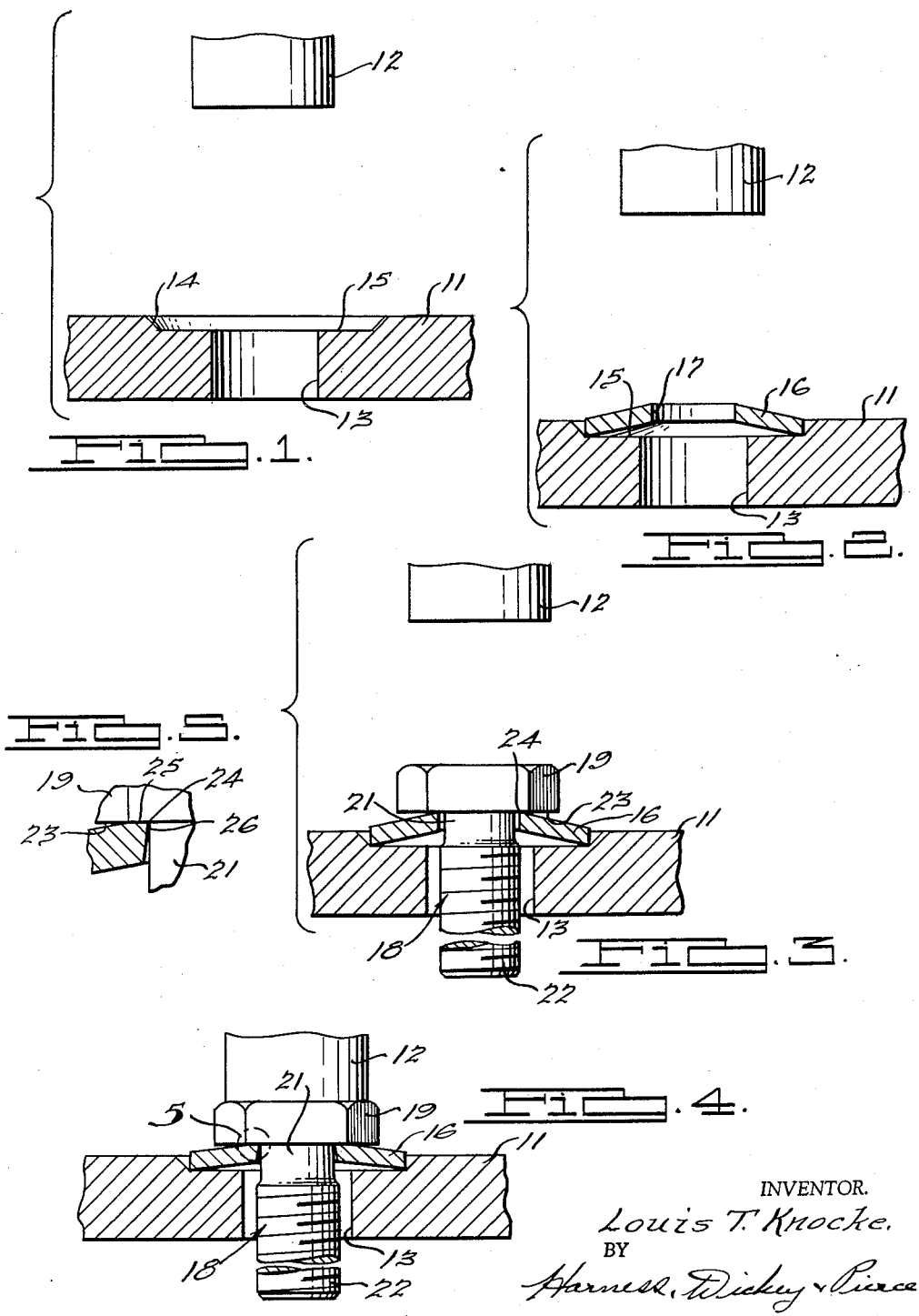
INVENTOR.
Louis T. Knocke.
BY
Harness, Dickey & Pierce
ATTORNEYS.

UNITED STATES PATENT OFFICE 3,009,176
Patented Nov. 21, 1961

3,009,176
METHOD OF ASSEMBLY OF BOLT
AND WASHER
Louis T. Knocke, 5578 Putnam, Birmingham, Mich.
Filed July 18, 1957, Ser. No. 672,606
1 Claim. (Cl. 10—10)

This invention relates to threaded fasteners, and more particularly to methods of preassembling lock washers or plain washers on bolts in order to increase the speed with which these bolts may be applied to the work.

It is an object of the invention to provide a novel and improved assembly method by means of which washers may be fixed in operative position on bolts with extreme rapidity and as part of a sequence of machine operations.

It is another object to provide an improved washer and bolt assembly method of this character which is especially adapted for mounting coned lock washers on bolts in such a manner that the washers may perform doweling and sealing functions when mounted on the work.

Other objects, features and advantages of the present invention will become apparent from the subsequent description, taken in conjunction with the accompanying drawings.

In the drawings:

FIGURE 1 is a cross-sectional view in elevation of a suitable apparatus for carrying out the novel method, the parts being shown at the beginning of an operation;

FIGURE 2 is a view similar to FIGURE 1 showing the first step in the operation using a coned lock washer;

FIGURE 3 shows the next step in the operation with the bolt disposed within the washer;

FIGURE 4 shows the final stage in the operation during which the washer is clinched to the bolt; and FIGURE 5 is a fragmentary elevational view, partly in cross section, of a portion of the assembled washer and bolt in the area marked "5" of FIGURE 4, showing the contacting areas of the parts.

In essence, the novel method comprises an arrangement by means of which the inner surface of a washer (surrounding the aperture thereof) is forced inwardly so that one edge of this inner surface is brought into frictional contact with the shank portion of a bolt at the juncture of this shank portion with the bolt head. In order to carry out the method, a coned washer is provided having an internal diameter such that partial or complete flattening of the washer will force a portion of the inner washer surface against the bolt shank. When so assembled, the washer and bolt may be easily applied to the work without the necessity of first placing the washer on the bolt during the fastening operation.

FIGURES 1–4 illustrate a suitable fixture for carrying out the novel method, although it will be understood that the method could likewise be carried out by other means. As shown, an anvil 11 is provided for holding the parts, with a hammer 12 disposed above the anvil. A clearance aperture 13 in an anvil 11 is disposed coaxially with hammer 12, and a circular recess 14 surrounds the upper end of aperture 13. The anvil, and especially surface 15 thereof in recess 14, is constructed of relatively hard steel so as to withstand the forces exerted during the operation. The diameter of recess 14 is about the same as or slightly greater than the unstressed outside diameter of the washer to be used in the operation, and the diameter of aperture 13 is larger than the bolt diameter.

As the first step in carrying out the operation with the use of the illustrated fixture, a washer 16 is placed in recess 14. The washer which is provided has a frusto-conical shape similar to that of lock washers now in use, and the washer is so disposed that its inner diameter is spaced from surface 15. The diameter of inner axial surface 17 of washer 16 is such that, when the washer is in its unstressed condition as shown in FIGURE 2, it will clear the bolt to be placed therein. The material of which the washer is made may vary, springlike metal being used if the washer is to be used as a lock washer, whereas softer steel may be utilized for plain washers which are to be flat in their final condition.

As the next step in the process, a bolt generally indicated at 18 is passed through the washer and into clearance aperture 13 as shown in FIGURE 3. Bolt 18 is of a conventional type having a head 19, a smooth shank portion 21 and a threaded portion 22. The diameter of shank portion 21 may be equal to the mean diameter of threaded portion 22 or any other conventional size. The undersurface 23 of bolt head 19 rests on upper inner edge 24 of washer 16 when the bolt is in position.

As the final step in the process, hammer 12 is caused to engage head 19 of bolt 18, forcing the bolt downwardly as shown in FIGURE 4. As this is done, edge 24 of inner washer surface 17 will be contracted as bolt head 19 causes washer 16 to be at least partially flattened. The relative dimensions of the parts are such that this contraction of edge 24 will cause the edge to bite into shank portion 21 of the bolt at the juncture of this shank portion with the undersurface 23 of bolt head 19. It will be appreciated that since the amount of contraction of edge 24 will be relatively small in relation to the diameter of the washer, this contraction will take place in a uniform manner so that edge 24 will engage bolt shank 21 substantially around its entire periphery. During this process, washer 16 will spread slightly within recess 14 of anvil 11, but, as indicated previously, the width of recess 14 is such as to prevent this spreading action sufficiently to cause the inner washer diameter to grip the bolt.

The manner in which hammer 12 engages bolt head 19 may vary according to requirements, but will usually consist of a progressive increase in pressure. The distance which hammer 12 travels after it has engaged bolt 19 will of course depend upon the movement required to procure proper gripping of washer 16 on the bolt shank, the gripping force preferably being sufficient to prevent the washer from being dislodged during ordinary handling of the assembly. As shown in FIGURE 4, the downward limit of travel for hammer 12 will be such that the final configuration of washer 16 will still be frusto-conical but to a lesser extent than previously. In other words, the assembled washer shown in FIGURE 4 may serve as a lock washer when the bolt is applied to the work. Should it be desired that a plain washer rather than a lock washer be mounted on bolt 18, the original unstressed shape of washer 16 may be flatter than that shown in FIGURES 2 and 3, and hammer 12 may be brought down to a final position such that washer 16 will be substantially flat. Although some spring-back of washer 16 could be expected in such cases upon withdrawal of hammer 12, it is obvious that the final shape of washer 16 may be controlled to a considerable extent, for example by enlarging the diameter of clearance aperture 13 with respect to the washer diameter so that a slight reverse cone shape may be momentarily applied to the washer.

After withdrawal of hammer 12 and removal of the assembled bolt and washer from anvil 11, the assembly is ready for use. It will be noted that the clinched parts may be so assembled as to permit ordinary handling of batches of the assembled parts without danger of the washers and bolts becoming disassembled.

The method described above is easily adaptable for production operations in which individual washer and bolts could be handled by automatic machines. The method is also particularly useful in assembling lock washers and bolts of the type in which the washer performs a sealing and doweling effect due to the engagement of its inner and outer edges with the bolt and work respectively. Such a construction is described in detail in my copending application Serial No. 672,647, filed July 18, 1957, and now abandoned. FIGURE 5, which is drawn on an enlarged scale, illustrates in a general way this construction. As shown, surface portions 25 and 26 of the washer are capable of firm engagement with undersurface 23 of bolt head 19 and with bolt shank 21 respectively to provide a sealing effect to prevent the passage of fluid. It will be understood that the present invention is not limited in its usefulness to assembly of the parts described in this copending application, but could be used for assembling a wide variety of bolts and washers of different types.

While it will be apparent that the preferred embodiment of the invention disclosed is well calculated to fulfill the objects above stated, it will be appreciated that the invention is susceptible to modification, variation and change wihout departing from the proper scope of fair meaning of the subjoined claim.

What is claimed is:

In a method of preassembling an unslotted spring-like conical lock washer on a bolt, the steps of supporting the outer edge of one side of the washer in an axial direction so that the inner washer diameter is spaced from said support, inserting a bolt in said washer in a direction toward said support until the bolt head rests on the adjacent edge of the inner diameter of the washer, forcing said bolt axially toward said support to partially but not completely flatten said washer in its final condition, and confining the outward spreading movement of said washer to prevent outward radial movement thereof and cause flattening and contracting of the washer inner diameter until at least said adjacent edge contracts to engage the bolt sufficiently to prevent its dislodgment during ordinary handling.

References Cited in the file of this patent

UNITED STATES PATENTS

| | | |
|---|---|---|
| 721,559 | Goodridge | Feb. 24, 1903 |
| 1,460,749 | Dull | July 3, 1923 |
| 2,289,066 | Olson | July 7, 1942 |
| 2,904,876 | Edelen | Sept. 22, 1959 |

FOREIGN PATENTS

| | | |
|---|---|---|
| 861,940 | Germany | Jan. 8, 1953 |